(12) United States Patent
Virtanen

(10) Patent No.: US 7,164,562 B2
(45) Date of Patent: Jan. 16, 2007

(54) CONFIGURATION AND METHOD FOR PROTECTING CONVERTER MEANS

(75) Inventor: Reijo Virtanen, Vantaa (FI)

(73) Assignee: ABB OY, Helsinki (FI)

( * ) Notice: Subject to any disclaimer, the term of this patent is extended or adjusted under 35 U.S.C. 154(b) by 0 days.

(21) Appl. No.: 10/514,163

(22) PCT Filed: Mar. 31, 2004

(86) PCT No.: PCT/FI2004/000192

§ 371 (c)(1),
(2), (4) Date: Nov. 12, 2004

(87) PCT Pub. No.: WO2004/091085

PCT Pub. Date: Oct. 21, 2004

(65) Prior Publication Data

US 2005/0237678 A1    Oct. 27, 2005

(30) Foreign Application Priority Data

Apr. 8, 2003  (FI) .................................. 20030525
Jan. 13, 2004 (FI) .................................. 20040034

(51) Int. Cl.
*H02H 7/06* (2006.01)
*H02H 7/00* (2006.01)
*H02H 9/00* (2006.01)
*H02H 3/20* (2006.01)
*H02H 9/04* (2006.01)

(52) U.S. Cl. .................... 361/20; 361/18; 361/91.8
(58) Field of Classification Search ................ 361/18, 361/20, 91.8
See application file for complete search history.

(56) References Cited

U.S. PATENT DOCUMENTS

| 5,687,049 A | 11/1997 | Mangtani |
| 5,734,256 A * | 3/1998 | Larsen et al. ............... 323/207 |
| 2002/0079706 A1 | 6/2002 | Rebsdorf et al. |

* cited by examiner

*Primary Examiner*—Brian Sircus
*Assistant Examiner*—Dharti H. Patel
(74) *Attorney, Agent, or Firm*—Dykema Gossett PLLC

(57) ABSTRACT

A protection configuration for converter means which comprise a plurality of controllable switches, the protection configuration comprising a protection circuit coupled to the alternating voltage side of the converter means, which protection circuit comprises at least one protective switch configured to short-circuit the alternating voltage side of the converter means, wherein the protection configuration, in predetermined failure situations, is configured to close the protective switch and thus to short-circuit the alternating voltage side of the converter means. After the failure situation has cleared up, the protection configuration is configured to short-circuit the alternating voltage side of the converter means by means of the controllable switches to enhance commutation of the protective switch.

16 Claims, 4 Drawing Sheets

CONFIGURATION AND METHOD FOR PROTECTING CONVERTER MEANS

BACKGROUND OF THE INVENTION

The invention relates to protecting converter means of an electric machine drive from overvoltages and overcurrents.

Converters are used in various generator and motor drives. One such electric machine drive comprising converters is a double-fed slip-ring generator configuration whose rotor circuit comprises two converters having a direct voltage intermediate circuit therebetween. One of these converters is situated electrically between the direct voltage intermediate circuit and a rotor while the other converter is situated electrically between the direct voltage intermediate circuit and an electrical network to be supplied.

Such a double-fed slip-ring generator configuration, which has a particular nominal rotational speed, is usually configured to operate within a particular rotation speed range having an upper limit and a lower limit which depend on the selected transformation ratio of a stator and a rotor. The rotational speed range of a double-fed slip-ring generator configuration whose nominal rotational speed is 1500 1/min may be e.g. 1000 to 2000 1/min. When the generator rotates at a rotational speed lower than the nominal rotational speed, some of the power fed by the stator is fed to the rotor via the converters and slip rings of the generator. Similarly, when the generator rotates at a rotational speed higher than the nominal rotational speed, power is fed via the slip rings of the rotor and the converters from the rotor towards the network supplied by the generator.

When the rotational speed range of the generator configuration corresponds to the above-disclosed values, i.e. the configuration is configured to operate within a rotational speed range which deviates by one third from the nominal rotational speed of the generator, the two converters of a rotor circuit may be dimensioned to correspond with only one third of the power of the generator. This saves investment costs but the relatively low power handling capacity of the converters has to be taken into account when designing the protection of the generator configuration.

During a network failure, the voltage of a direct voltage intermediate circuit may due to the transformation ratio of the generation rise high enough to damage the converters in the rotor circuit. It is well known to protect the converters in a rotor circuit by a protection circuit comprising a thyristor so that in a failure situation the rotor circuit is short-circuited between the rotor and the converters via the thyristor. In connection with a triggering of the thyristor, switches of the converter are opened so that the current of the converters ends. This enables the converters of the rotor circuit to be protected from an overvoltage and zero diodes of the converters to be protected from an overcurrent.

The use of the above-described protection circuit implemented by a thyristor has various problems which depend on the type and properties of the electric machine drive whose converter is being protected by the protection circuit. In all cases, a basic problem is the commutation of a protection thyristor. For instance, in the case of the above-described double-fed slip-ring generator configuration, the problem is that the normal operation of the generator configuration cannot be restarted after a failure unless the generator is first made currentless. The prerequisite of bringing the generator in to a currentless state is based on the fact that otherwise the protection thyristor does not commutate reliably.

BRIEF DESCRIPTION OF THE INVENTION

An object of the invention is to provide a protection configuration for converter means so as to enable the above-mentioned problems to be solved. The object of the invention is achieved by a protection configuration for converter means which is characterized by what is disclosed in the independent claim. Preferred embodiments of the invention are disclosed in the dependent claims.

The idea underlying the invention is that the commutation of a protective switch of a protection circuit of converter means is enhanced by short-circuiting the alternating voltage side of the converter means by controllable switches that belong to the converter means.

An advantage of the protection configuration of the invention is that the normal operation of the electric machine configuration may be continued substantially immediately after a failure situation.

A further object of the invention is to provide a method of using a protection configuration for converter means.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

Figure 1:
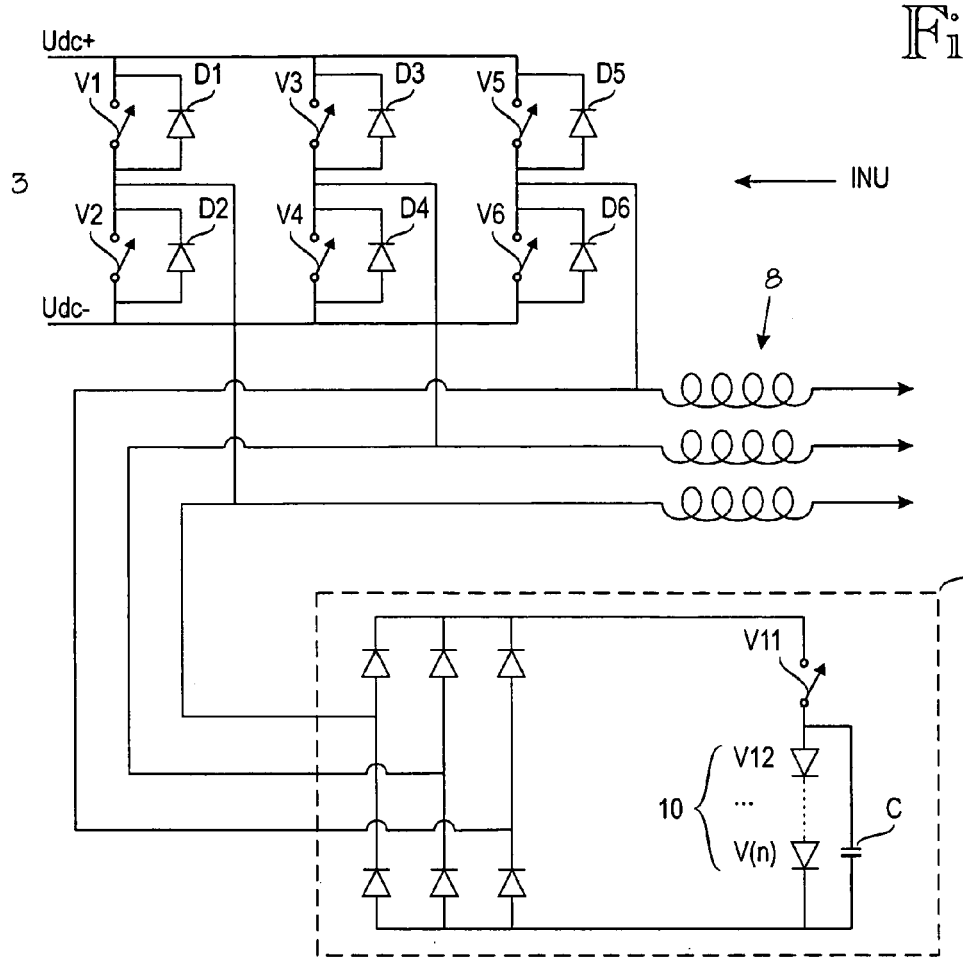
FIG. 1 shows a protection configuration for converter means according to an embodiment of the invention.

FIG. 1 shows a protection configuration for a rotor circuit of a double-fed slip-ring generator according to an embodiment of the invention, which protection configuration comprises rotor-side converter means INU, du/dt filters 8 coupled to phases L1 to L3, and a protection circuit 2. For the sake of simplicity, no components configured to measure electrical quantities, to process measurement results and to control switches are shown in the figures.

The rotor-side converter means INU are provided with a direct voltage side and an alternating voltage side. The direct voltage side is electrically coupled to a direct voltage intermediate circuit 3. The alternating voltage side is electrically coupled to a rotor of a generator. The rotor-side converter means INU comprise means for rectifying the three-phase voltage of the rotor and for feeding it to the direct voltage intermediate circuit 3, as well as means for inverting the direct voltage of the direct voltage intermediate circuit 3 and for feeding it to the rotor. The rotor-side converter means INU are thus configured to feed power both towards the rotor and towards a network supplied by the generator.

In FIG. 1, the protection circuit 2 is coupled between the rotor-side converter means INU and the du/dt filters 8. It is also possible to couple the du/dt filters 8 to an output of the alternating-voltage-side of the rotor-side converter means INU to produce du/dt filtering between the converter means INU and the protection circuit. Similarly, it is possible to divide a du/dt filter into two parts and couple the protection circuit 2 between these parts. In some cases, it is also possible to omit such du/dt filters 8 from the configuration altogether.

The rotor-side converter means INU comprise six controllable switches V1 to V6 configured to modulate an alternating voltage from the direct voltage of the direct voltage intermediate circuit 3. The switches V1 to V6 may be e.g. transistors or other corresponding semiconductor switches.

The rotor-side converter means INU further comprise six zero diodes D1 to D6, each being coupled in parallel with a respective switch V1 to V6. The zero diodes D1 to D6 are coupled such that they rectify the current flowing from the rotor towards the direct voltage intermediate circuit 3. In an embodiment, the zero diodes D1 to D6 are integrated into respective controllable switches V1 to V6. An IGBT, for instance, includes such a structure.

The protection circuit 2 of the configuration of FIG. 1 comprises a three-phase rectifying bridge implemented by diodes. A protective switch V11 and auxiliary commutation means 10 are coupled in series between the positive pole and the negative pole of the rectifying bridge, the auxiliary commutation means 10 being configured to enhance the commutation of the protective switch V11. The auxiliary commutation means 10 comprise a plurality of diodes V12 to V(n) coupled in series, and a capacitor C coupled in parallel with the plurality of diodes. The protective switch V11 may be e.g. a thyristor.

Figure 2:
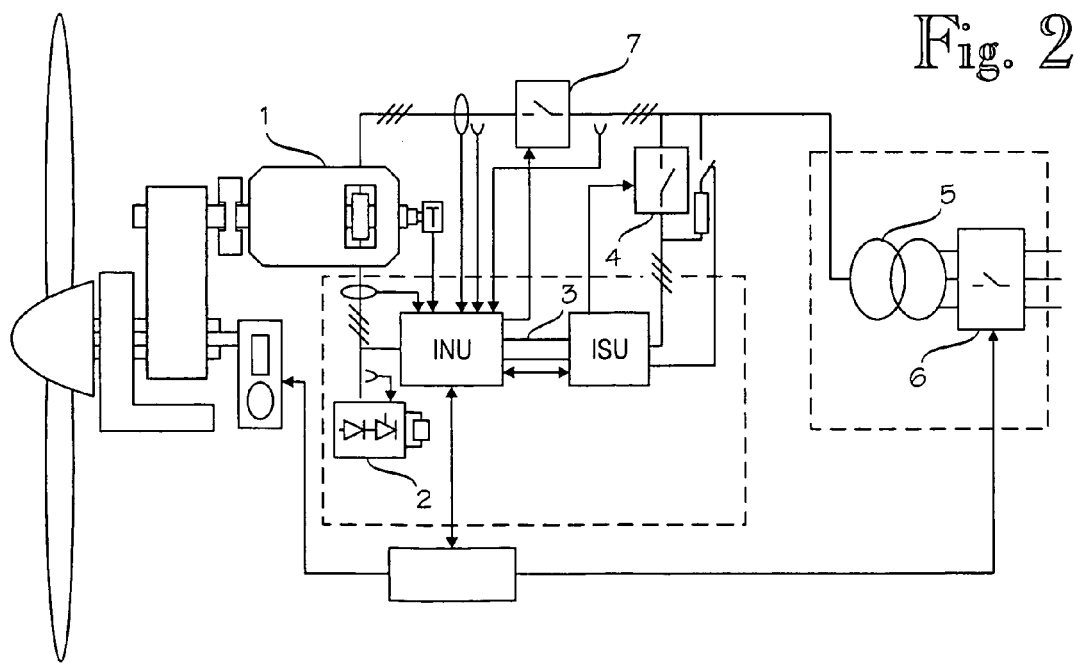
FIG. 2 shows a wind power drive comprising the protection configuration of FIG. 1.

FIG. 2 shows a wind power drive comprising the protection configuration of FIG. 1. The wind power drive of FIG. 2 uses an asynchronous generator 1 equipped with slip rings. In addition to the protection circuit 2, the rotor-side converter INU and the direct voltage intermediate circuit 3, a rotor circuit of the asynchronous generator 1 comprises a network converter ISU. The rotor circuit is connected to an electrical network to be supplied via a switch 4 of the rotor circuit, a power transformer 5 and a medium voltage switch apparatus 6. A stator circuit of the asynchronous generator 1 is connected to the electrical network to be supplied via a main switch 7 when the main switch 7 is located at a point electrically situated between the stator of the generator 1 and the point at which the stator and rotor circuits converge before the power transformer 5.

When the protection configuration of the rotor circuit detects a network failure fulfilling predetermined conditions, the protection configuration opens the switches V1 to V6 and controls the protective switch V11 to be closed. A network failure may be defined e.g. as a situation wherein the rotor current or the voltage of a direct voltage intermediate circuit exceeds a predetermined limit value. Closing the protective switch V11 short-circuits the rotor circuit, in which case short circuit current coming from the rotor flows via the protective switch V11 of the protection circuit 2.

In the case of the configuration of FIG. 2, the network failure fulfilling the predetermined conditions may be e.g. a voltage dip of the network to be supplied. Without protective measures, the voltage dip of the network to be supplied may cause a dangerously large increase in the rotor and stator currents as well as in the voltage of the direct voltage intermediate circuit 3.

When the protection configuration detects that the network failure is over, it closes the switches V2, V4 and V6, so that the short circuit current coming from the rotor is transferred from the protection circuit 2 to the rotor-side converter means such that the short circuit current starts to flow via a negative busbar Udc– of the direct voltage intermediate circuit 3. Alternatively, the short circuit current coming from the rotor may be transferred from the protection circuit 2 to the rotor-side converter means by closing the switches V1, V3 and V5, in which case the short circuit current starts to flow via a positive busbar Udc+ of the direct voltage intermediate circuit 3. The transfer of the short circuit current coming from the rotor to the rotor-side converter means is based on the fact that the combined threshold voltage of the diode bridge of the protection circuit 2, the protective switch V11 and the diodes V12 to V(n) is higher than the threshold voltage of the components of the rotor-side converter means INU via which the short circuit current is made to flow. It is desirable to transfer the short circuit current coming from the rotor away from the protection circuit 2 in order to enable the protective switch V11 to be commutated.

The capacitor C of the protection circuit 2, coupled in parallel with the diodes V12 to V(n) and charging when the short circuit current flows in the protection circuit 2, assists the commutation of the protective switch V11.

When the short circuit current has been transferred from the protection circuit 2 to the rotor-side converter means, i.e. it has started to flow via the closed switches V2, V4 and V6 (or V1, V3 and V5), and the protective switch V11 has commutated, the modulation may be restarted by using the switches V1 to V6.

The auxiliary commutation means 10 may also be implemented in a manner other than that shown in FIG. 1. It is, for instance, possible to add one or more resistors in series with the protective switch V11. The diodes V12 to V(n) may be replaced by other components having a suitable threshold voltage. The auxiliary commutation means may be at least partly integrated into the protective switch V11, and the protective switch V11 may be configured to be switched off on the basis of a control signal. The protective switch V11 may thus be e.g. an IGBT or a GTO. The protection circuit 2 may comprise phase-specific protective switches V11, in which case the protection circuit 2 needs no rectifying bridge. The auxiliary commutation means 10 may further comprise a forced commutation circuit coupled in parallel with the protective switch V11. Such forced commutation circuits are well known in the field, so their structure will not be discussed herein.

In the case of the configuration of FIG. 1, and when the operation situation is such that a failure situation is over and the switches V2, V4 and V6 are closed in order to transfer the short circuit current coming from the rotor to flow via the aforementioned switches, the commutation of the protective switch V11 may be followed e.g. by measuring the currents flowing through the switches V2, V4 and V6 as well as the rate of changes of these currents. The details of a commutation event of the protective switch V11, such as the duration of the commutation event, depend on the type of the protective switch V11, which is thus to be taken into account when selecting the control parameters of the protective configuration.

It may be problematic to start the normal operation of the rotor-side converter INU from a situation wherein the protective switch V11 of the protection circuit 2 has commutated and the three-phase-side of the converter INU has been short-circuited by the controllable switches V2, V4 and V6. If the modulation is to be continued normally, it is possible that the rotor and stator currents of the generator 1 remain high and difficult to control for a long time. It is also possible that no normal operating state is achieved without further action.

The aforementioned problem with controlling the rotor and stator currents can be solved by opening the rotor circuit, after which the network to be supplied sees the generator 1 as if it were an open transformer or a choke. Consequently, the current of the stator of the generator quickly drops to a level which substantially corresponds to its magnetization current. The normal operation of the rotor circuit may then be started safely.

In the configuration of FIG. 2, the current of the rotor circuit may be measured and utilized in determining the moment at which a normal modulation may be started by the switches V1 to V6 of the rotor-side converter INU. For instance in a situation wherein the network to be supplied comprised a voltage dip, which caused the protective switch V11 to be closed, the chances for starting a normal modulation may be estimated by measuring the current of the rotor circuit when, after the commutation of the protective switch V11, the controllable switches V1 to V6 are open. Such measurement may be carried out e.g. in a the rotor-side converter INU. When current bursts are no longer detected in the rotor circuit, the normal modulation may be started safely.

The rotor circuit may be opened e.g. by opening the controllable switches V1 to V6 of the converter INU. If the configuration of FIG. 2 is provided with an additional switch between the rotor of the generator 1 and the rotor-side converter INU, the rotor circuit may be opened by the additional switch.

The stator circuit of the generator 1 of the wind power drive of FIG. 2 may be kept coupled to the network to be supplied during an entire network failure, such as a voltage dip. If the aforementioned opening of the rotor circuit carried out in order to calm the rotor and stator currents is carried out by opening the controllable switches V1 to V6 of the rotor-side converter INU, the network converter ISU is coupled to the stator circuit and the network to be supplied during the entire network failure, enabling the network converter ISU to maintain the voltage of the direct voltage intermediate circuit 3 during the network failure.

When the protection configuration of FIG. 1 receives information indicating that there might be a failure in the network to be supplied, which requires the protection circuit 2 to be short-circuited, the switches V1 to V6 may first be opened and wait for a predetermined period of time before closing the protective switch V11. If, during this period of time, current and/or voltage information is received indicating that the failure requiring the protective switch V11 to be closed is over, the operation is continued in a normal manner.

In the above description, opening of the controllable switches V1 to V6 means that the aim is to open these switches using control. Depending on the type of the controllable switches V1 to V6, they are thus not further subjected e.g. to triggering, and if the controllable switches are configured to shut off themselves on the basis of the control of the current passing through, such opening comprises feeding an opening pulse to the switches. For example in a situation wherein in a failure situation a high current flows via the controllable switches V1 to V6 of the rotor-side converter INU, the aforementioned control procedures do not necessarily succeed in ending the current flowing through the switches V1 to V6. Using the expression used in the above description, opening the switches V1 to V6 does not thus necessarily shut off the current passing therethrough but the protective switch V11 also needs to be closed. The situation is thus similar to that when a mechanical switch has been opened but an electric arc burns therein.

Even when the switches V1 to V6 have been opened, the modelling of the electric machine configuration continues. In the generator configuration of FIG. 2, the control means know all the time e.g. the stator and rotor currents, the voltage of the network to be supplied, the position of the shaft and the rotational speed of the generator. It is advantageous to continue the modelling when estimating a safe moment to continue the modulation.

Figure 3:
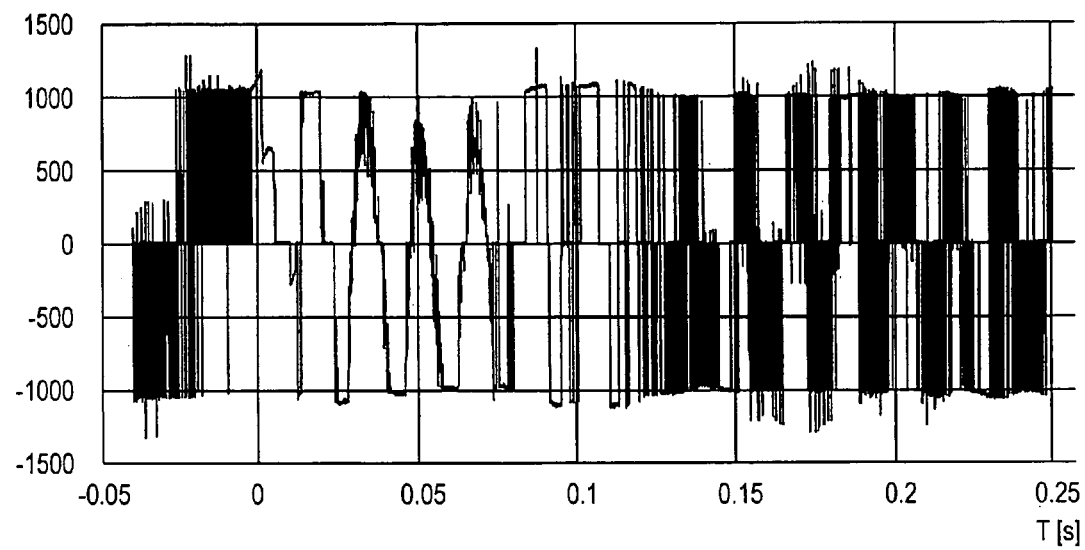
FIGS. 3 to 8 show failure situation currents and voltages in the wind power drive of FIG. 2.

FIGS. 3 to 8 show the behaviour of currents and voltages in the wind power drive of FIG. 2 when the protection configuration of the converter means is used in the above-described manner when the voltage of the network to be supplied drops 65%. The values of the currents and voltages are measured at 20 µs intervals during a period of time −0.04000 s to 0.28764 s. FIGS. 3 to 8 show the following quantities:

FIG. 3 Uuv, rot=phase voltage U-V of rotor-side converter (INU)

Figure 4:
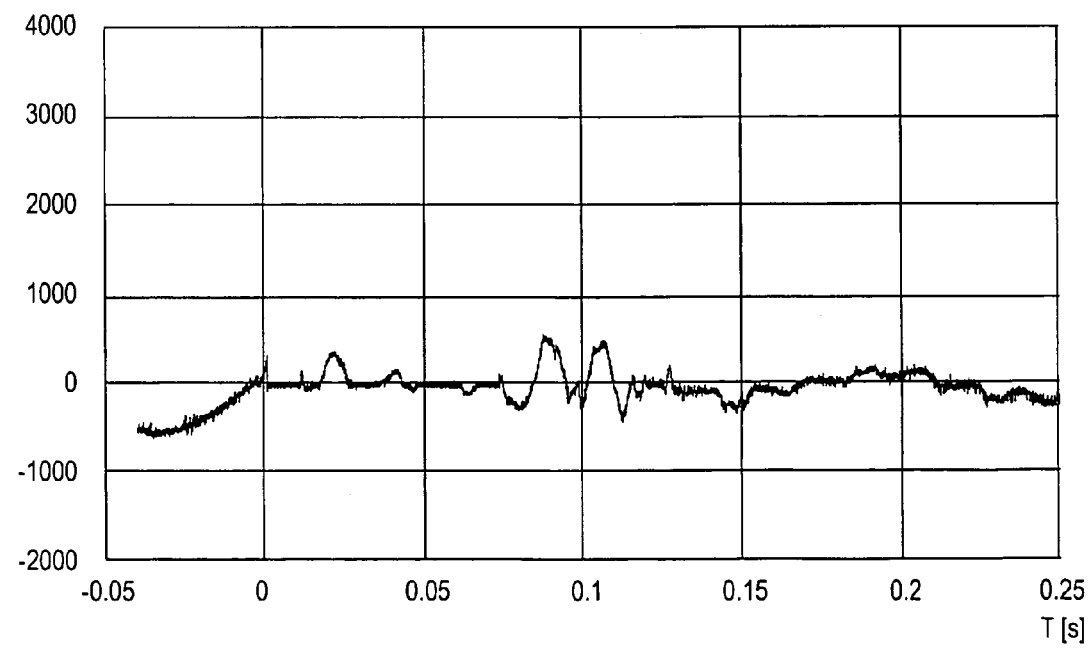

FIG. 4 Iu, rot=current of U-phase of rotor-side converter (INU)

Figure 5:
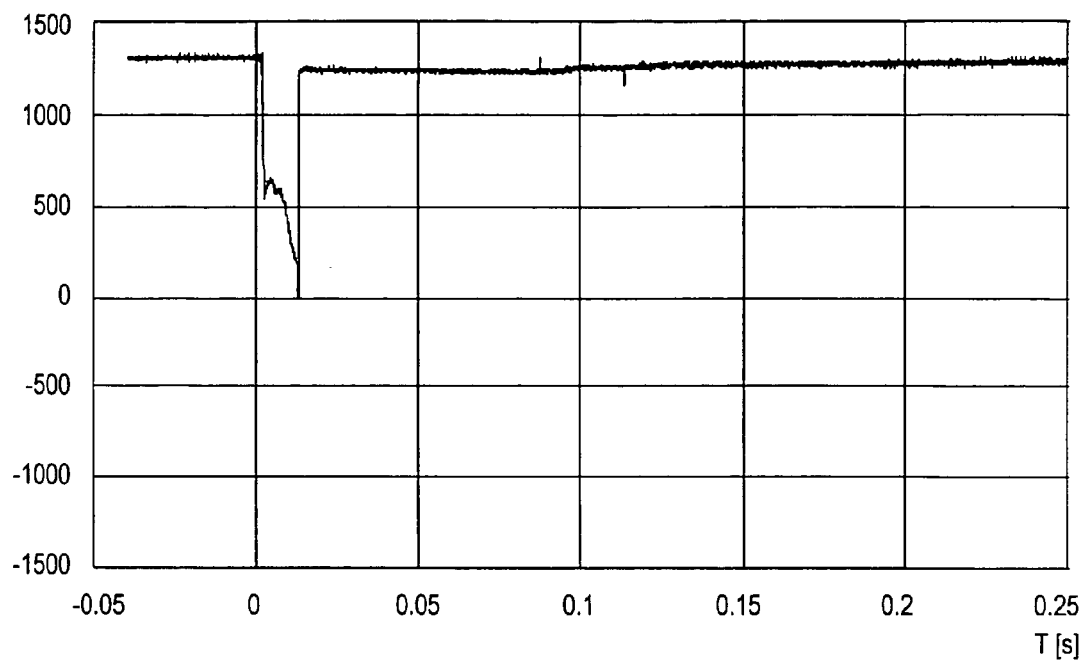

FIG. 5 Udc, crowbar=voltage of rectifying bridge of protection circuit 2

Figure 6:
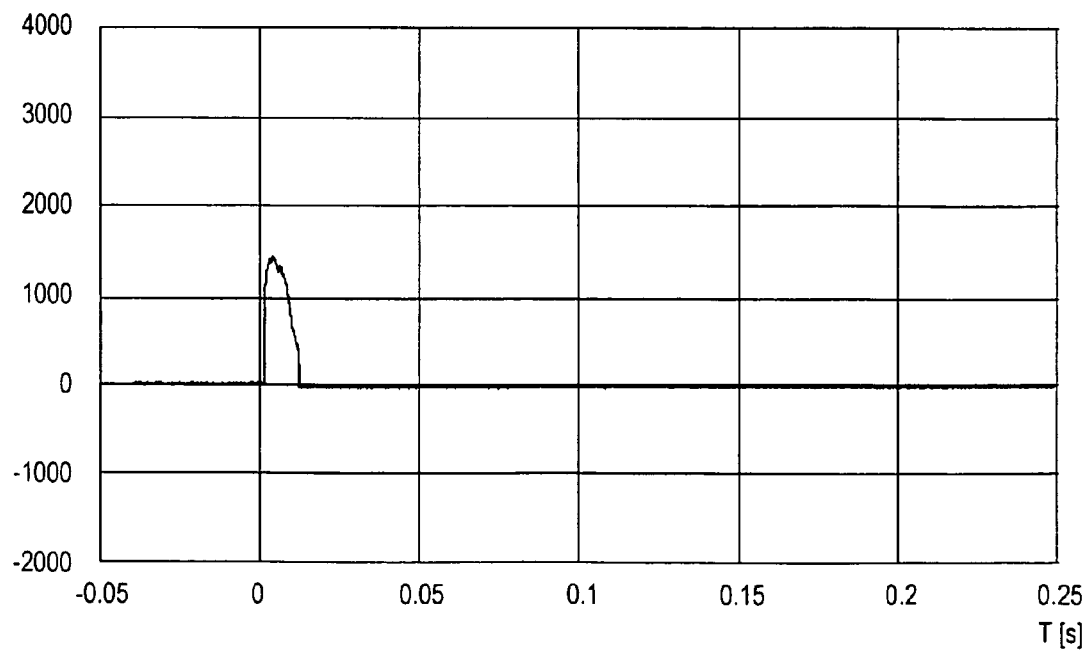

FIG. 6 Idc, crowbar=current of protective switch V11 of protection circuit 2

Figure 7:
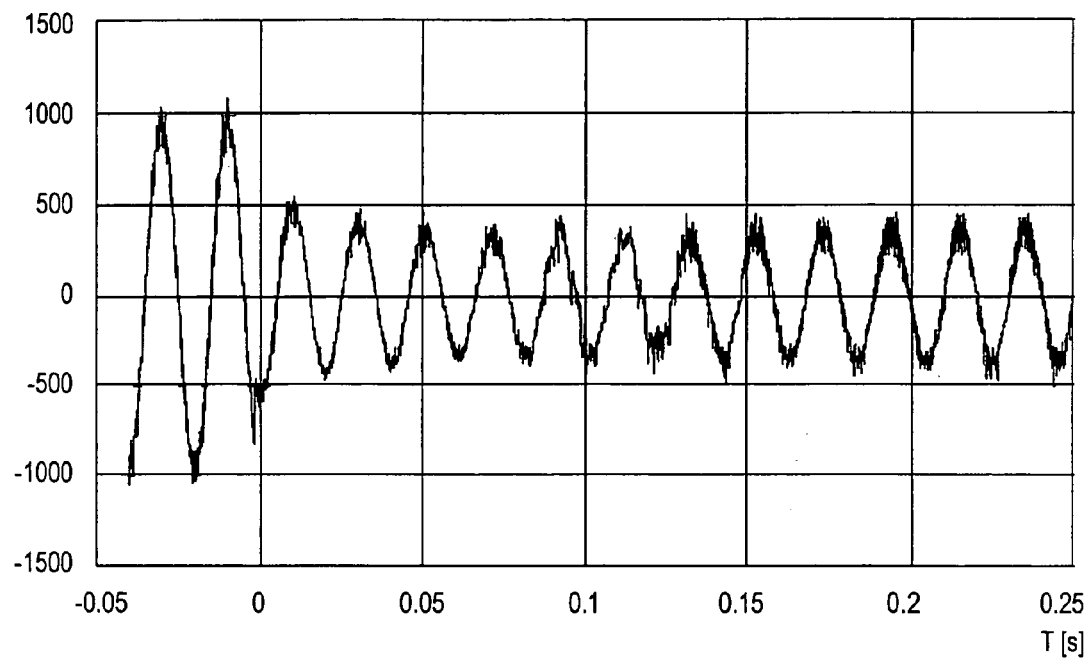

FIG. 7 Uuw, grid=phase voltage U-W of network to be supplied

Figure 8:
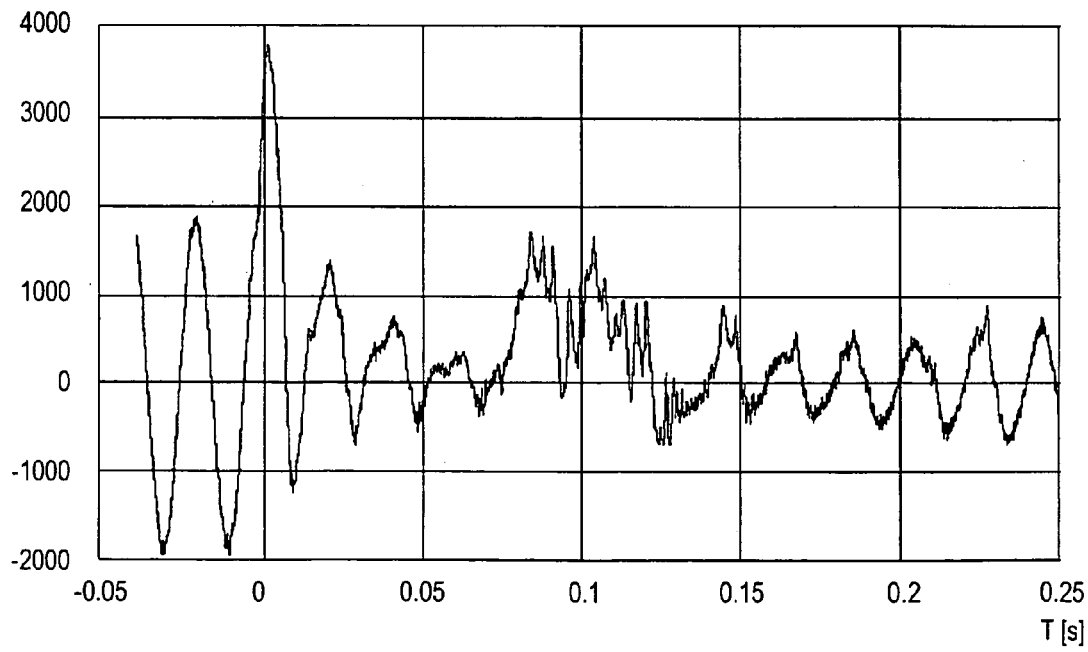

FIG. 8 Iu, grid=current of U-phase of network to be supplied

Although the example shown herein relates to the protection of the converters of the rotor circuit of the double-fed slip-ring generator, the protection configuration of the invention may also be used for protecting the converters of electrical machine configurations of other types. The protection configuration of the invention is suited for protecting the converters of both asynchronous and synchronous machine drives, and such drives may be either generator drives or motor drives. It is obvious to one skilled in the art that the basic idea of the invention may be implemented in many different ways. The invention and its embodiments are thus not restricted to the above-described examples but may vary within the scope of the claims.

The invention claimed is:

1. A protection configuration for converter means, which converter means are provided with a direct voltage side coupled to a direct voltage intermediate circuit, and an alternating voltage side, and which converter means comprise means for inverting the direct voltage of the direct voltage intermediate circuit and for feeding it to the alternating voltage side, the inverting means comprising a plurality of controllable switches, the protection configuration comprising a protection circuit coupled to the alternating voltage side of the converter means, which protection circuit comprises at least one protective switch configured to short-circuit the alternating voltage side of the converter means, wherein the protection configuration, in predetermined failure situations, is configured to close the protective switch and thus to short-circuit the alternating voltage side of the converter means, wherein after the failure situation is over, the controllable switches are configured to short-circuit the alternating voltage side of the converter means to redirect at least a portion of the current in the protection configuration through said controllable switches to thereby enhance commutation of the protective switch.

2. A protection configuration as claimed in claim 1, wherein the predetermined failure situations, the configuration is configured to open the plurality of controllable switches of the inverter means of the converter means prior to closing the protective switch, and to leave the controllable switches open unit the failure situation is over.

3. A protection configuration as claimed in claim 1 wherein the configuration, after the commutation of the protective switch, is configured to open the controllable switches of the converter means and to keep them open until modulation can be started safely.

4. A protection configuration as claimed in claim 1, wherein the protection circuit comprises auxiliary commutation means configured to enhance the commutation of the protective switch.

5. A protection configuration as claimed in claim 4, wherein the auxiliary commutation means comprise a plurality of diodes coupled in series with the protective switch, and a capacitor coupled in parallel with the plurality of diodes.

6. A protection configuration as claimed in claim 1, wherein the converter means further comprise means for rectifying the alternating voltage of the alternating voltage side and for feeding it to the direct voltage intermediate circuit.

7. A protection configuration as claimed in claim 1, wherein when the failure situation is over and the protective switch has commutated, the configuration is configured to return to a normal operating state wherein the plurality of controllable switches of the inverter means of the converter means are controlled in order to invert the direct voltage of the direct voltage intermediate circuit.

8. A protection configuration as claimed in claim 1, wherein the configuration is configured to protect a rotor circuit of a double-fed slip-ring generator.

9. A method of using a protection configuration for converter means, which converter means are provided with a direct voltage side coupled to a direct voltage intermediate circuit, and an alternating voltage side, and which converter means comprise means for inverting the direct voltage of the direct voltage intermediate circuit and for feeding it to the alternating voltage side, the inverting means comprising a plurality of controllable switches, the protection configuration comprising a protection circuit coupled to the alternating voltage side of the converter means, which protection circuit comprises at least one protective switch configured to short-circuit the alternating voltage side of the converter means, the method comprising the step of closing, in predetermined failure situations, the protective switch and thus short-circuiting the alternating voltage side of the converter means, wherein the method further comprises the step of configuring the controllable switches to short-circuit, after the failure situation is over, the alternating voltage side of the converter means to redirect at least a portion of the current in the protection configuration through the controllable switches to therby enhance commutation of the protective switch.

10. A method as claimed in claim 9, wherein the predetermined failure situations, the plurality of controllable switches of the inverter means of the converter means are opened prior to closing the protective switch, and in that the controllable switches are left open until the failure situation is over.

11. A method as claimed in claim in claim 9, wherein after the protective switch has commutated, the method comprises the step of making the converter means currentless by opening the current circuit to which the converter means belong.

12. A method as claimed in claim 11, wherein the opening of the current circuit is carried out by opening the controllable switches of the converter means.

13. A method as claimed in claim 11, wherein after the commutation of the protective switch, the current circuit to which the converter means belong is kept open until modulation can be started safely.

14. A method as claimed in claim 13, wherein the converter means are converter means of a rotor side of a double-fed slip-ring generator, and in that after the commutation of the protective switch, the current circuit to which the converter means belong is kept open until the current of a stator of the generator has dropped to a level substantially corresponding to its magnetization current.

15. A protection configuration as claimed in claim 2, wherein the configuration, after the commutation of the protective switch, is configured to open the controllable switches of the converter means and to keep them open until modulation can be started safely.

16. A method as claimed in claim 10, wherein after the protective switch has commutated, the method comprises the step of making the converter means currentless by opening the current circuit to which the converter means belong.

* * * * *